June 25, 1957     H. B. KATZ     2,796,700
TRANSPLANTING BAG FOR NURSERY STOCK
Filed Sept. 14, 1953
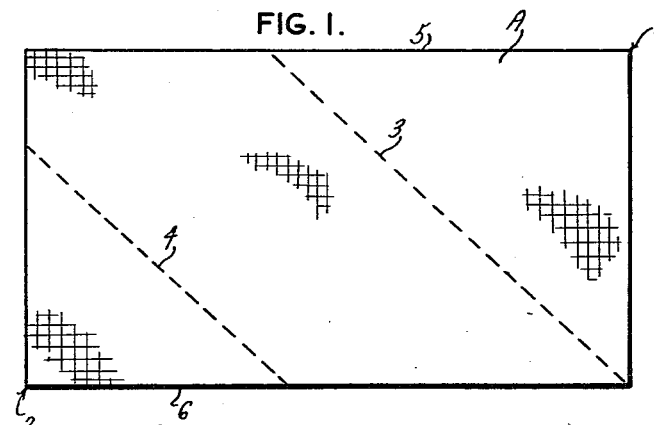
FIG. 1.
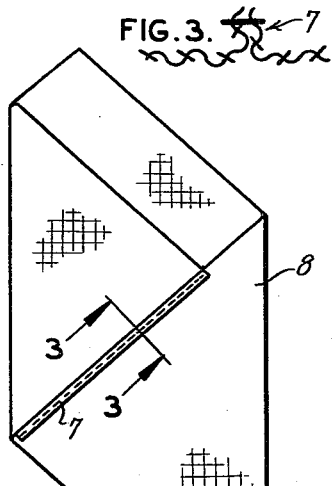
FIG. 2.
FIG. 3.
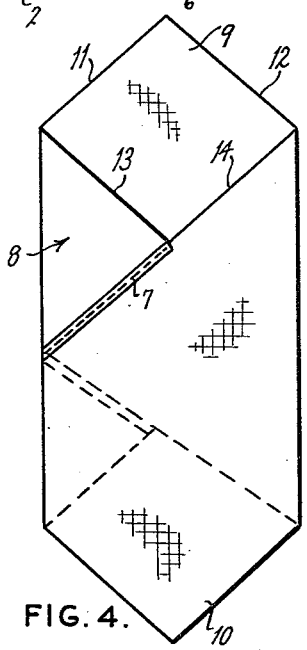
FIG. 4.
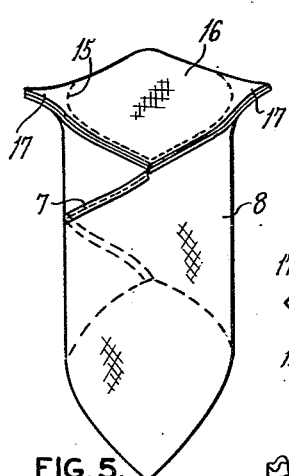
FIG. 5.
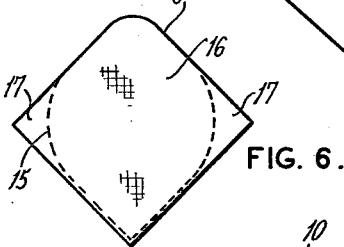
FIG. 6.
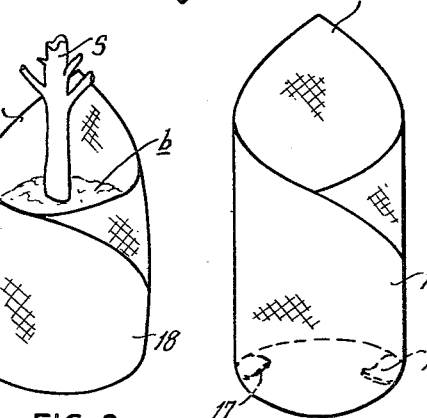
FIG. 7. FIG. 8.
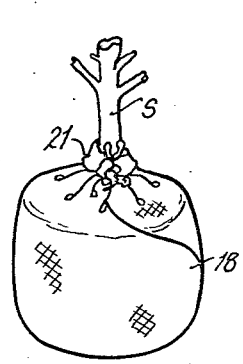
FIG. 9. FIG. 10.
INVENTOR.
HARRY B. KATZ
BY Alfred Petchaft
ATTORNEY

United States Patent Office 2,796,700
Patented June 25, 1957

2,796,700
TRANSPLANTING BAG FOR NURSERY STOCK

Harry B. Katz, St. Louis, Mo.

Application September 14, 1953, Serial No. 379,835

6 Claims. (Cl. 47—37)

This invention relates in general to bags and more particularly to a type of bag suitable for encasing the body of earth or so-called "ball" surrounding the roots of nursery stock for transplanting purposes.

It is conventional practice in the nursery business to grow small trees, bushes, and other similar plants in nursery farms, greenhouses, and the like for ultimate transplantation when the plant or tree reaches a proper stage of strength and maturity. The transplanting procedure requires that a substantial amount of earth (or so-called "ball") be removed from the ground with the roots of the plant or tree and it is desirable that the ball be preserved intact until the plant or tree is again set into the ground in its permanent location. Furthermore, from the time that the plant or tree is removed from the ground until it is again replanted, it is desirable that the ball be kept moist and disturbed as little as possible so as to avoid damage to the root system of the plant. For these reasons it has become an accepted practice in the nursery business to enclose the ball in a suitable piece of material such as a square of burlap. Because of variations in size, it is necessary for a nursery to maintain a stock of burlap squares of various different sizes, and frequently a square of the wrong size is used for balling a particular plant with the result that the burlap is either wasted or the ball is improperly encased. Finally, the use of flat squares of material frequently requires the efforts of two or more workmen with an attendant waste of labor. Balling bags of the type exemplified in United States Patent 2,600,300, issued to the present inventor under date of June 10, 1952, represents a substantial improvement over the previous practice of balling nursery stock with burlap squares, but even this expedient involves certain difficulties because the balling bag of this patent is bunched together at the bottom in a large knot which is pushed up into the ball when the plant is set down upon the floor of a truck or railroad car or nursery shed. This indentation of the under side of the earth of the ball frequently damages a part of the root system and, in addition, provides a somewhat unstable bottom surface upon which the balled plant may rest, so that the plants occasionally topple over and are additionally damaged. In addition to this, the knot or closure-forming element in the bottom of the bag may be insecurely formed and will break open in use, completely destroying the ball and ruining the plant, tree, or shrub.

It is, therefore, the primary object of the present invention to provide a balling bag which is flat-bottomed and tubular in form so that the ball of a plant, tree or shrub may be quickly and conveniently inserted.

It is another object of the present invention to provide a bag suitable for use in balling plants, trees, and shrubs, to form a relatively flat-bottomed stable ball which will sit upright without damage to the root system encased within the ball.

It is a further object of the present invention to provide a flat-bottomed, smooth-surfaced balling bag having a readily adjustable diametral size so as to accommodate a fairly wide range of plant balls of different shapes and sizes.

It is an additional object of the present invention to provide a unique balling bag and method of making the same which is extremely economical and efficient.

With the above and other objects in view, my invention resides in the novel features of form, construction, arrangement, and combination of parts presently described and pointed out in the claims.

In the accompanying drawings (one sheet)—

Figure 1 is a plan view of a rectangular section of woven fabric material utilized in making a balling bag in accordance with the present invention;

Figure 2 is a plan view of the fabric section angularly folded over upon itself and stitched together along a portion of its abutting margins to form a bias-tube;

Figure 3 is a fragmentary sectional view taken along line 3—3 of Figure 2;

Figure 4 is a top plan view of the bias-tube rolled about its longitudinal axis into symmetrical configuration;

Figure 5 is a perspective view of the bias-tube with one of its ends folded over and stitched to form a flat-surfaced end closure across the bottom of the balling bag;

Figure 6 is a top plan view of the partially finished balling bag shown in Figure 5;

Figure 7 is a perspective view of the finished balling bag after it has been finished, turned inside out, and set in upright position to receive a plant-ball; and Figures 8, 9 and 10 are perspective views showing the successive steps by which a plant-ball is placed within the balling bag.

Referring now in more detail and by reference numerals to the drawings which illustrate a preferred embodiment of the present invention, A designates a rectangular section of woven fabric, such as burlap, for example. As shown in Figure 1, the section of burlap is substantially longer than it is wide and the two diagonally opposite corners 1, 2 are folded inwardly and diagonally toward each other along the fold lines 3, 4 until the margin 5 and the margin 6 meet in substantially edgewise abutment. The abutting portions of the margins 5 and 6 are then stitched together in a simple seam 7 thereby forming a bias-tube 8 as shown in Figure 2.

The overlying surfaces of the bias-tube 8 are then shifted laterally with respect to each other, or the tube is "rolled," so to speak, until it assumes the symmetrical shape shown in Figure 4, in which position the opposite ends of the bias-tube 8 will assume the form of triangular flaps 9, 10. The bias-tube 8 is then opened up into more or less tubular form and the flap 9 folded down so that its margins 11, 12 will be brought into edgewise abutment against the margins 13, 14, respectively. These margins are then stitched together by a single, somewhat arcuate line of stitches 15 to form a substantially flat end closure or bottom wall 16 and laterally projecting triangular ears 17, as best seen in Figures 5 and 6. The bias-tube 8 is then turned inside out to form a finished balling bag 18 in which the raw edges of the seams 7, 15 are all folded more or less inconspicuously and flatly within the interior of the bag, as best seen in Figure 7, with the opposite end opening upwardly and provided around half of its periphery with the flap 10.

In use, a plant or shrub S having an earth ball $b$ is inserted into the balling bag 18 as shown in Figure 8. Since the balling bag 18 is formed from a bias-tube, it is diametrally elastic and will accommodate itself snugly to the size of the ball $b$. It will be understood in this connection that the vertical dimension of the balling bag 18 is greater than the vertical dimension of the ball $b$ so that a substantial portion of the balling bag 18 will project upwardly beyond the ball b when the flap 10 is manually gripped and gently tugged upwardly to tighten the balling bag 18 and cause it to shrink snugly around the ball b. Thereupon the flap 10 is vertically slit by a pocket knife, scissors, or other suitable instrument dividing it into two substantially equal triangular tabs 19, 19', as best seen in Figure 9. The central portion 20 of the upper margin of the balling bag 18 is thereupon pulled inwardly against the trunk or stem of the shrub S and the tabs 19, 19' lap snugly therearound and are knotted to each other, drawing the entire upper end of the balling bag 18 into securely closed position, and held within a closure knot 21, as best seen in Figure 10.

The ball b of the shrub S is thus securely held within the balling bag 18 in a flat-bottomed, smooth-surfaced configuration which is substantially stable when set in upright position and does not have any rough, nubby elements to gouge into and injury the root system of the plant. Furthermore, the balling bag of the present invention is closed by the interknotting of its own tie-forming tabs, thereby eliminating the use of string which can and frequently does damage the bark of the shrub trunk or stem.

It should be understood that changes and modifications in the form, construction, arrangement, and combination of the several parts of the bag may be made and substituted for those herein shown and described without departing from the nature and principle of my invention.

Having thus described my invention, what I claim and desire to secure by Letters Patent is—

1. A balling bag for encasing the ball of plants, trees, shrubs and the like comprising a somewhat stretchable tube having an outwardly projecting tab folded over and stitched to the adjacent margins of said tube in the provision of a substantially planar bottom wall, and an upwardly presented substantially circular top opening having an outwardly projecting tab slit to form a plurality of elongated tie-forming members adapted for encircling the stem of the plant, tree or shrub and pulling the upper end of the balling bag closed therearound.

2. A balling bag for encasing the ball of plants, shrubs and the like comprising a bias-tube having an outwardly projecting tab folded over and stitched to the adjacent margins of said tube in the provisions of a substantially planar bottom wall, and an upwardly presented substantially circular top opening having an outwardly projecting tab slit to form a plurality of elongated tie-forming members adapted for encircling the stem of the plant, tree or shrub and pulling the upper end of the balling bag closed therearound.

3. A balling bag for encasing the ball of plants, trees, shrubs and the like comprising a woven bias-tube having an outwardly projecting tab folded over and stitched to the adjacent margins of said tube in the provision of a substantially planar bottom wall, and an upwardly presented substantially circular top opening having an outwardly projecting tab slit to form a plurality of elongated tie-forming members adapted for encircling the stem of the plant, tree or shrub and pulling the upper end of the balling bag closed therearound.

4. A balling bag for encasing the ball of plants, trees, shrubs and the like comprising a rectangular section of stretchable fabric having two diagonally opposite corners folded over toward each other along fold-lines which are angularly disposed to the margins of the section so that portions of two opposite parallel margins of the section are disposed in edgewise abutment, said abutting marginal portions of the section being seamed together to form a tube having axially projecting triangular end tabs, one of said end tabs being folded over transversely with respect to the tube and stitched along its margins to the adjacent end margins of the tube to form a substantially flat bottom wall for the tube.

5. A balling bag for encasing the ball of plants, trees, shrubs and the like comprising a rectangular section of woven fabric having its warp and woof respectively parallel to the margins of the section and having two diagonally opposite corners folded over toward each other along fold-lines which are angularly disposed to the margins of the section so that portions of two opposite parallel margins of the section are disposed in edgewise abutment, said abutting marginal portions of the section being seamed together to form a bias-tube having axially projecting triangular end tabs, one of said end tabs being folded over transversely with respect to the tube and stitched along its margins to the adjacent end margins of the tube to form a substantially flat bottom wall for the tube.

6. A balling bag for encasing the ball of plants, trees, shrubs, and the like comprising a tubular section of stretchable fabric having substantially circular cross-sectional shape, said tubular section being integrally provided around approximately half of its lower margin with a bottom extension portion having V-shaped converging margins, said tubular section further being provided around the opposite half of its upper margin with an upwardly extending integral top extension having V-shaped upwardly converging margins, said bottom extension being folded inwardly so as to extend across the bottom of the tubular section with its margins stitched to the other half of the bottom margin of the tubular section to form a substantially flat bottom wall thereacross.

References Cited in the file of this patent

UNITED STATES PATENTS

| | | |
|---|---|---|
| 1,964,887 | Lovett | July 3, 1934 |
| 1,988,886 | Wilson | Jan. 22, 1935 |
| 1,994,962 | Rushfeldt | Mar. 19, 1935 |
| 2,097,929 | Lovett | Nov. 2, 1937 |
| 2,504,124 | Hick | Apr. 18, 1950 |
| 2,600,300 | Katz | June 10, 1952 |
| 2,616,469 | Katz et al. | Nov. 4, 1952 |